United States Patent [19]

Hinden

[11] 4,264,995

[45] May 5, 1981

[54] INSULATION SUPPORT FIXTURE AND METHOD OF MAKING THE SAME

[75] Inventor: Milton Hinden, Massapequa, N.Y.

[73] Assignee: Duro Dyne Corporation, Farmingdale, N.Y.

[21] Appl. No.: 49,178

[22] Filed: Jun. 18, 1979

[51] Int. Cl.³ .............................................. B21G 3/10
[52] U.S. Cl. .................................... 10/1 R; 10/27 R; 411/396; 411/900; 411/456
[58] Field of Search .......................... 85/21, 28, 9 W; 228/175; 10/1 R, 27 R, 2, 10 R

[56] References Cited

U.S. PATENT DOCUMENTS

| | | | |
|---|---|---|---|
| 1,139,479 | 5/1915 | Brightman | 10/27 R |
| 2,226,006 | 12/1940 | Maze | 85/28 |
| 2,621,129 | 12/1952 | Ramsbottom et al. | 99/171 |
| 3,230,817 | 1/1966 | Thomas | 85/28 |

*Primary Examiner*—Mark Rosenbaum
*Attorney, Agent, or Firm*—Mark T. Basseches; Paula T. Basseches

[57] ABSTRACT

The present invention is directed to a method of manufacturing a support fixture for securing thermal insulation, such as glass wool batts and the like, to air conduit ducts forming parts of heating and air conditioning systems. The device comprises a metal pin weldingly connected to a planar sheet metal blank, the rear surface of the blank carrying a double faced adhesive tape, the rear surface of which is adapted to be adhesively connected to a duct. In accordance with the method of making the fixture, an improved adhesive connection is obtained between the sheet metal member and the adhesive tape by applying the tape to the blank while the blank is hot as a result of effecting the welded connection between the blank and the pin.

4 Claims, 2 Drawing Figures

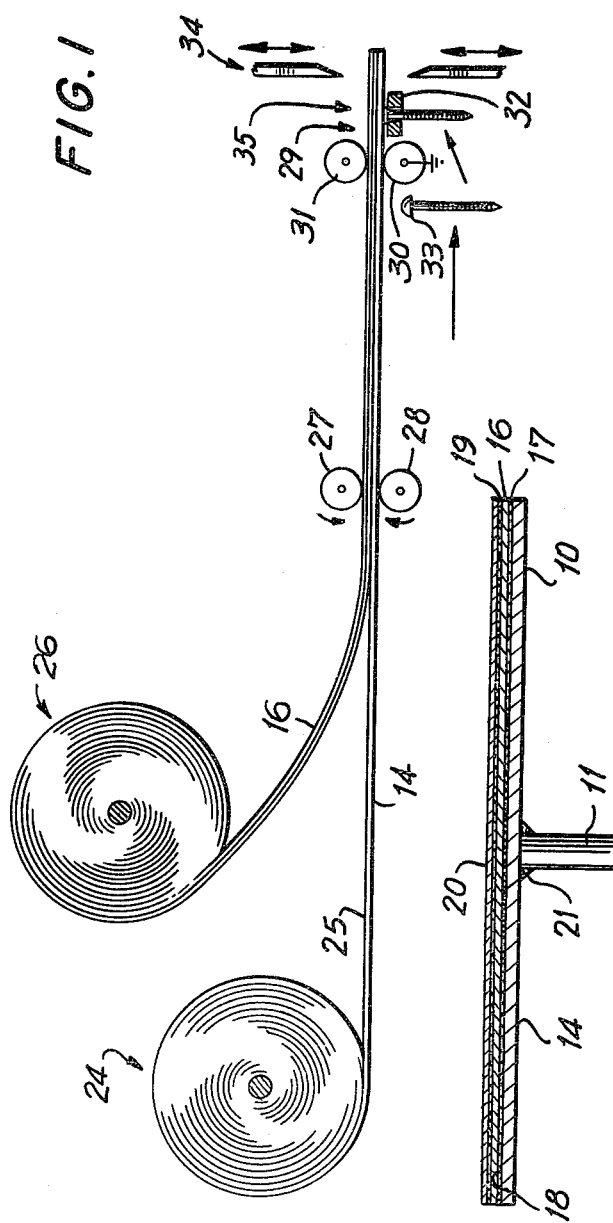

INSULATION SUPPORT FIXTURE AND METHOD OF MAKING THE SAME

BACKGROUND OF THE INVENTION

1. Field of the Invention

The present invention is in the field of insulation support fixtures and the method of making the same.

2. The Prior Art

In the heating and air conditioning industry it is standard practice, in order to minimize heat transfer through the air ducts or conduits to line one or both of the surfaces of the conduit with a lightweight thermal insulating material, such as glass wool urethane foam or the like. Since in many instances foam is applied interiorly of the ducts, access to the foam, after installation of the duct system, is obtained only with great difficulty, requiring disassembly of the system.

It is thus important that the insulating material be dependably secured to the duct.

It is present practice to apply a glue to the interface between the duct and the insulation and, in addition, effect a mechanical connection, such as a headed pin or clip passed through the insulation and secured to the duct. In many instances, the mechanical connection is effected by welding the pin to the surface of the duct. However, in small metal working shops not having access to the welding equipment required, it has been proposed to provide insulation support fixtures in the nature of enlarged thumb tacks, the rear face of the tacks having a pressure sensitive adhesive coating thereon. The fixtures are employed by pressing the adhesive back against a portion of the duct. Thereafter the insulation is emplaced, the sharpened point of the fixture being passed outwardly through the insulation material. Thereafter a washer-like clip is forced over the shank of the pin.

As will be evident from the foregoing, the security of the mechanical connection is dependent upon the security of the adhesive connection between the adhesive layer and duct and also between the adhesive layer, which normally constitutes a double-sided adhesive tape, and the head of the pin.

In the support fixtures heretofore known, connection between the pin and the sheet metal backing is provided by passing a pin having a small head through an aperture in the sheet metal blank and thereafter crimping the metal surrounding the pin tightly against the shank, a double-faced adhesive tape having previously been applied to the back of the metal blank.

Pins of the type described have numerous disadvantages. Since the head of the pin projects slightly beyond the rear surface of the tape, the blank no longer presents an absolutely planar configuration. The bowed or distorted rear face of the device weakens the adhesive connection achieved when the head is pressed against a duct. More significantly, the pin head which projects rearwardly through the tape layer engages directly against the duct, thereby presenting a heat conductive path from the duct through the insulation, with consequent condensation problems. As will be readily recognized, since the conduit defines an air path and is subjected to vibrational stresses, any weakness in the original connection will not only result in a premature separation of the pin from the duct, but will also result in a rattling of the separated pin against the metal face of the duct.

SUMMARY OF THE INVENTION

The present invention may be summarized as directed to a novel method of fabricating insulation support fixtures of the type hereinabove described and to the resultant fixture.

In accordance with the invention, a metal band of desired width is progressively advanced. A welded connection is effected between the metal pin and one surface of the band, whereby the head of the pin is securely affixed to the surface. A roll of double-faced adhesive is advanced in a path parallel to the path of the band and engaged against the band in the area in registry with the pin while the band is heated as a result of the welding operation.

The weld, which may be effected either before contact between the band and the tape, or after such contact has been made, thus functions to augment the security of attachment between the tape and the metal band.

Thereafter, increments are severed from the composite of band, pin and tape to form individual hanger fixtures. Since the pin is secured to one face of the band, no degree of convexity is introduced on the opposite face of the band, whereby a flat-against-flat construction is presented, minimizing the possibility of separation of the welding pin from the duct.

Accordingly, it is an object of the invention to provide an improved method of fabricating an insulation hanger fixture.

A further object of the invention is the provision of a method as described wherein the adhesive connection between the double sided adhesive tape and the head of the hanger fixture is strengthened as a result of the contacting of said surface while the heat of welding is present.

Still a further object of the invention is the provision of a method in accordance with that described wherein the resultant hanger fixture presents a planar configuration of the rear face to facilitate subsequent connection of the hanger to the duct.

Still a further object of the invention is the provision of an improved insulation hanger fixture made in accordance with the method of the invention, where the support tape isolates the pin from the duct.

To attain these objects and such further objects as may appear herein or be hereinafter pointed out, reference is made to the accompanying drawings, forming a part hereof, in which:

FIG. 1 is a schematic view illustrating the method of forming the hanger members in accordance with the invention;

FIG. 2 is a magnified sectional view taken on the line 2—2 of FIG. 1.

Referring now to the drawings, and initially to FIG. 2, the insulation hanger device comprises a head portion 10 formed of sheet metal, to which has been attached at right angles a shank portion 11. The shank 11 may be corrugated or ribbed, as at 12, defining a series of annular shoulders 13 directed toward the under surface 14 of the head 10.

The shank terminates in a sharpened tip 15. The shank is attached to a duct or the like (not shown) by a double-faced adhesive tape including a carrier web 16 having an adhesive under surface or layer 17 adhesively secured to the upper face 18 of the head 10.

The web 16 includes an outer layer 19 of pressure sensitive adhesive covered by a release sheet 20.

In accordance with the illustrated embodiment, the shank 11 is secured to the under surface 14 of the head 10 by a weld 21. The pin is used in the manner of insulation hanger fixtures heretofore known, namely by stripping the release layer 20 and forcing the now exposed pressure sensitive adhesive layer 19 against a selected portion of the duct, whereby the fixture is mounted securely to the duct.

After the insulation material is positioned by forcing the same over the point 15 of the shank and against the under face 14 of the head, a retainer washer 22 of spring material having a central aperture 23 of diameter slightly smaller than the maximum diameter of the shank is forced over the shank toward the head, the washer being retained by the shoulders 13 against retractile movement.

Turning now to FIG. 1, there is schematically illustrated an apparatus for fabricating the hanger fixture. Such apparatus includes an in feed station 24 wherein a storage supply or coil 25 of sheet metal stock of appropriate width is mounted for pay-off. 26 represents an in feed station for a double-faced pressure sensitive adhesive tape 16. The pressure sensitive adhesive tape may employ as the adhesive component any of a series of pressure sensitive adhesive formulations. By way of example and without limitation, suitable pressure sensitive adhesive formulations may be based upon rubber based formulations or acrylic formulations or combinations thereof. Additionally, while the carrier has been described as a double-faced pressure sensitive adhesive tape, it will be readily recognized, and the present application is to be interpreted as encompassing, a foam carrier which has been impregnated with pressure sensitive adhesive. Thus, by way of example, a cross linked polyethylene foam impregnated with rubber based adhesive, or a high density polyurethane foam impregnated with acrylic based adhesive may function as the attachment mechanism.

The tape 16, which is preferably of the same width as the metal stock 25, is led into contact with the metal stock and passed between paired driver rollers 27, 28 which advance the sandwiched metal and tape toward a welding station 29. A rotary grounding electrode 30 is engaged against the under surface of the sheet metal 25 immediately upstream of the welding station 29, the electrode 30 reacting against the hold down roller 31 disposed in opposition to the grounding electrode 30.

Welding is effected at the station 29 by advancing the pin toward the under surface 14 of the sheet stock while the shank 11 is mounted within an electrode, diagrammatically illustrated at 32, having an annular aperture therein, the electrode engaging the under surface 33 of the pin surrounding the head. Preferably an avil (not shown) may be disposed above the welding station 29 so that when the pin is urged against the under surface of the metal a reactive force is applied, to permit the proper pressure to be developed to secure an efficient spot weld.

When the desired contact is secured, spot welding current is caused to flow, melting the head of the pin and securely affixing the same to the under surface 14 of the metal band.

The concept of welding per se the pin against a metal band is well known in the art and, accordingly, protracted disthereof is not considered necessary.

After attachment of the pin to the band, the composite is advanced to a shearing station 34, where individual fixtures are formed by transversely severing the metal 25 and tape 16 at appropriate spaced locations upstream of, or in trailing position, of an attached pin.

Preferably, the device is activated by a Geneva or step type drive mechanism whereby the tape and metal band are stepwise advanced and retained in fixed position during the performance of the various operations, such as welding and severing.

It is an important feature of the present invention that the strength of the connection between the tape and metal band is augmented by reliance upon the heat of the weld to activate or soften the adhesive layer in contact with the metal band so as more securely to link the noted components.

Certain adhesives, such as acrylonitrile-butadiene based adhesives, by virtue of their subjection to welding heat, are converted from a thermoplastic to a thermoset condition, in which latter condition a very secure bond is achieved.

Preferably the support layer or web 16 forming a part of the adhesive tape is formed of a foam or a paper or like material which has high thermal insulating properties so that the outermost layer of adhesive 19 is not unduly heated to the point of driving off the solvents and plasticizers thereof.

While in the present apparatus the tape component is illustrated as having been contacted with the metal band upstream or in advance of the welding station 29, whereby the weld is formed after the adhesive tape is positioned, it has been found desirable, in many instances, to feed the tape into contact with the band 25 at a position or station such as the position 35 immediately downstream of the welding station 29.

The downstream in feed station described should be located sufficiently close to the welding station that the metal band 25 retains at least enough of the heat of welding to produce the desired activation effects. Obviously, if it is desired to dissipate a larger component of the welding heat, contact should be made further downstream and, conversely, if it is desired to utilize the full effects of the heat generated, the contact between tape and band should be effected immediately downstream of the weld or, as illustrated, upstream of the weld. The effects of heat will, in a measure, be dependent upon the selected adhesive material and the insulating value of the adhesive carrier.

The above described invention, in its broadest aspects, is directed to the novel concept of forming an insulation hanger fixture by weldingly connecting a supporting pin or shank member to a metal blank and affixing a pressure sensitive tape layer to the other surface of the metal, utilizing the welding heat as a means of augmenting the effective attachment between the adhesive and the head of the fixture.

The adhesive composition should, as noted, be selected such as to be improved as a result of the heating step.

It will be observed that the procedure described leaves the surface of the metal remote from the pin in a flatwise condition rather than convex, as is the case with pressure attached insulation hanger fixtures heretofore known.

Likewise it will be observed that the tape layer serves the double function of providing support for the fixture and thermally isolating the pin from the duct, to minimize condensation and/or heat loss problems.

Numerous variations will occur to those skilled in the art as a result of familiarization with the disclosure hereinabove contained. Accordingly, the invention is to be broadly construed within the scope of the appended claims.

Having thus described the invention and illustrated its use, what is claimed as new and is desired to be secured by Letters Patent is:

1. The method of manufacturing a thermal insulation hanger comprising the steps of providing an elongate band of metallic sheet stock material having a first and second surface, providing a metallic pin member sharpened at one end, weldingly connecting the other end of said pin member to said first surface of said stock material, providing a roll of adhesive tape material having on both of its faces a pressure sensitive adhesive substance, connecting one adhesive face of said tape material with said second surface of said stock material at an area in registry with said pin member while said second surface is in a heated condition as a result of said welding operation, thereby adhesively to connect said tape to said band, and thereafter effecting a transverse cut through said band and attached tape to sever an increment of said band and tape carrying said connected pin thereby to provide a thermal insulation hanger member.

2. The method in accordance with claim 1 wherein said welded connection between said pin and stock material is formed in advance of contacting said one adhesive face of said tape with said other surface of said stock material.

3. The method in accordance with claim 1 wherein said tape material includes a backing web having a low thermal conductivity factor and said welded connection between said pin and said stock material is formed after contacting said adhesive tape to said stock material.

4. The method in accordance with claim 1 wherein said adhesive tape comprises a foam carrier impregnated with adhesive.

* * * * *